(12) United States Patent
Corradina (10) Patent No.: US 11,198,256 B2
(45) Date of Patent: Dec. 14, 2021

(54) MACHINE FOR WELDING WORKPIECES MADE OF PLASTIC MATERIALS

(71) Applicant: Automotive Lighting Italia S.p.A., Venaria Reale (IT)

(72) Inventor: Luca Corradina, Tolmezzo (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 129 days.

(21) Appl. No.: 16/535,630

(22) Filed: Aug. 8, 2019

(65) Prior Publication Data

US 2020/0047424 A1 Feb. 13, 2020

(30) Foreign Application Priority Data

Aug. 10, 2018 (EP) .................................. 18188547

(51) Int. Cl.
| | | |
|---|---|---|
| *B29C 65/78* | (2006.01) | |
| *B29C 65/08* | (2006.01) | |
| *B29C 65/16* | (2006.01) | |
| *F21S 43/50* | (2018.01) | |
| *F21S 41/29* | (2018.01) | |

(Continued)

(52) U.S. Cl.
CPC ...... *B29C 65/7802* (2013.01); *B29C 65/0618* (2013.01); *B29C 65/08* (2013.01); *B29C 65/7841* (2013.01); *B29C 66/81431* (2013.01); *F21S 41/29* (2018.01); *F21S 43/51* (2018.01); *B29C 66/8322* (2013.01); *B29L 2031/747* (2013.01)

(58) Field of Classification Search
CPC .......... B29C 66/8322; B29C 66/83221; B29C 65/7841
See application file for complete search history.

(56) References Cited

U.S. PATENT DOCUMENTS

| | | | |
|---|---|---|---|
| 6,017,141 A | 1/2000 | Sugiyama et al. | |
| 6,033,505 A | 7/2000 | Sugiyama et al. | |

(Continued)

FOREIGN PATENT DOCUMENTS

| | | |
|---|---|---|
| JP | H0839693 | 2/1996 |
| JP | 2000025116 | 1/2000 |

(Continued)

OTHER PUBLICATIONS

Machine translation of JP2016008551A (Year: 2016).*
European Search Report for European Patent Application No. 18188547 dated Jan. 16, 2019.

*Primary Examiner* — Scott W Dodds (57) ABSTRACT

Machine for welding workpieces made of plastic materials of the type comprising: two workpiece-carrying fixtures each provided with a template having a recess adapted to accommodate a respective plastic workpiece to be welded; a moving assembly adapted to selectively couple and press the two workpiece-carrying fixtures to/against each other, so as to tighten the plastic workpieces housed in the templates one against the other; a vibrating member which is adapted to vibrate on command a first workpiece-carrying fixture; automatic piece locking means adapted to selectively lock/immobilise the plastic workpiece to be welded inside the template of the first workpiece-carrying fixture; and an electronic control unit adapted to drive/control said automatic piece locking means.

16 Claims, 7 Drawing Sheets

(51) Int. Cl.
*B29C 65/06* (2006.01)
*B29C 65/00* (2006.01)
*B29L 31/00* (2006.01)

(56) References Cited

U.S. PATENT DOCUMENTS

2007/0084539 A1    4/2007  Junker
2019/0193799 A1*   6/2019  Schuette ............. B29C 65/7802

FOREIGN PATENT DOCUMENTS

| JP | 2009000913 | | 1/2009 | |
| JP | 2016008551 | | 1/2016 | |
| JP | 6340263 | * | 6/2018 | ............. C29C 65/20 |

* cited by examiner

MACHINE FOR WELDING WORKPIECES MADE OF PLASTIC MATERIALS

CROSS-REFERENCE TO RELATED APPLICATIONS

This patent application claims priority from European Patent Application No. 18188547.6 filed on Aug. 10, 2018, the entire disclosure of which is incorporated herein by reference.

TECHNICAL FIELD

The present invention relates to a machine for welding workpieces made of plastic materials.

In greater detail, the present invention preferably relates to a machine for vibration welding the outer casing of headlights and taillights for cars and similar vehicles. Use to which the following disclosure will make explicit reference without however losing in generality.

BACKGROUND ART

As is known, headlights and taillights of cars usually comprise: a concave and substantially basin-shaped rear body which is structured so as to be stably recessed into a seat specially made in the bodywork of the vehicle; a substantially transparent, front half-shell which is arranged to substantially hermetically close the mouth of the rear body so as to surface outside of the bodywork of the vehicle; and a series of electrically-powered light-emitting assemblies that are placed inside the rear body, each beneath a respective transparent or semi-transparent sector of the front half-shell, and are adapted to selectively backlight each the corresponding transparent or semi-transparent sector of the front half-shell.

In the most modern automotive lights, the rear body and the front half-shell are both made of plastic material via injection moulding, and are usually vibration welded one over the other after insertion of the light-emitting devices inside the rear body.

The machines that perform the vibration welding of the two components of the automotive light are traditionally provided with an upper workpiece-carrying fixture and a lower workpiece-carrying fixture, which are arranged one above the other perfectly faced to one another, are specifically structured to accommodate one the front half-shell and the other the rear body of the automotive light, and are finally movable on command one toward the other so as to bring the two pieces of the automotive light in abutment one against the other.

In greater detail, the upper fixture is provided with a workpiece-holder template made of metal material and which has a recess shaped complementarily to the front half-shell, so as to be able to accommodate and retain the front half-shell, and is coupled to a vibrating member that can cause the entire template to vibrate in a predetermined horizontal direction, at given amplitude and frequency.

The lower fixture, in turn, is provided with a second workpiece-holder template made of metal material and which has a recess shaped complementarily to the rear body, so as to be able to accommodate and retain the rear body, and is coupled to a lifting apparatus that is able to bring the template of the lower fixture in abutment against the template of the upper fixture, so as to forcefully press the peripheral rim of the mouth of the rear body against the facing and complementary peripheral rim of the front half-shell.

Usually, the vibration welding occurs by vibrating the front half-shell for a few seconds relative to the rear body at a frequency of about 240-250 Hz (Hertz) and at an amplitude of about 0.8-0.9 mm (millimetres), simultaneously pressing the two pieces of the automotive light one against the other.

Despite being a particularly reliable and inexpensive process, up to now vibration welding has been used to produce small and medium-sized automotive lights, because front half-shells and rear bodies made via injection moulding have dimensional tolerances that usually hover around 0.05%, with the problems that this entails.

In fact, the recess of the template must necessarily be dimensioned so as to accommodate the larger piece.

In other words, taking as a reference a front half-shell with a nominal length of 500 mm (millimetres), the workpiece-holder template of the upper fixture must be provided with a recess shaped/dimensioned to accommodate a front half-shell with a maximum length of 500.25 mm (millimetres).

Obviously, since the same recess must also accommodate the smaller piece, i.e. the front half-shell with a maximum length of 499.75 mm (millimetres), it is possible to vibration weld the front half-shell to the rear body as long as the maximum deviation of the dimensions of the piece is largely less than the maximum amplitude of the vibrations generated by the vibrating member during the vibration welding process.

In fact, if this condition is not met, the front half-shell remains practically motionless inside the template of the upper fixture while the upper fixture is vibrated by the vibrating member.

Unfortunately, in case of automotive lights, the peripheral rim of the front half-shell is almost always made of a transparent or semi-transparent plastic material, so the area involved in the welding is always visible and therefore must be as small as possible.

Since dimensions of the workpiece area involved in the vibration welding increases as the amplitude of the vibration imparted to the template increases, this aesthetic obligation de facto imposes to limit the maximum amplitude of the vibration to not more than 1.5 mm (millimetres). Exceeding this value leads to produce automotive lights with macroscopic imperfections along the welding line.

This operating limitation leads to the fact that it is practically impossible to vibration weld the front half-shell and the rear body of an automotive light having dimensions greater than 40-50 cm, while ensuring high quality of the finished product.

To overcome this limit, some automotive-lights manufacturers conceived to use, on the upper fixture, small locking members which are secured to the body of the workpiece-holder template in a rigid and manually adjustable manner, and have the function of centring and locking the front half-shell on the template.

Unfortunately, the position of these centring members must be adjusted manually by the operator before inserting each single front half-shell into the workpiece-holder template, thus considerably lengthening the production times of the automotive light.

In addition, the locking members of the upper fixture have a very short operating life (no more than a few hundred welding cycles) because the mechanical vibrations transmitted to the workpiece-holder template tend to quickly break the anchoring screws and the other adjustment mechanisms that fix the centring members to the template, with all the problems that this entails.

DISCLOSURE OF THE INVENTION

Aim of the present invention is to provide a workpiece locking system which is capable of holding in place the front half-shell of the automotive light in the upper fixture template, adapting itself to the actual dimensions of the half-shell, and which is also immune from the problems due to the vibrations imparted by the vibrating member.

In compliance with these aims, according to the present invention there is provided a machine for welding workpieces made of plastic materials as defined in claim 1 and preferably, though not necessarily, in any one of the claims dependent thereon.

BRIEF DESCRIPTION OF THE DRAWINGS

The present invention will now be described with reference to the accompanying drawings, which illustrate a non-limiting embodiment thereof, in which:

FIG. 8 is a perspective and partially exploded view of the portion of the upper fixture shown in FIGS. 6 and 7; whereas

BEST MODE FOR CARRYING OUT THE INVENTION

Figure 1:
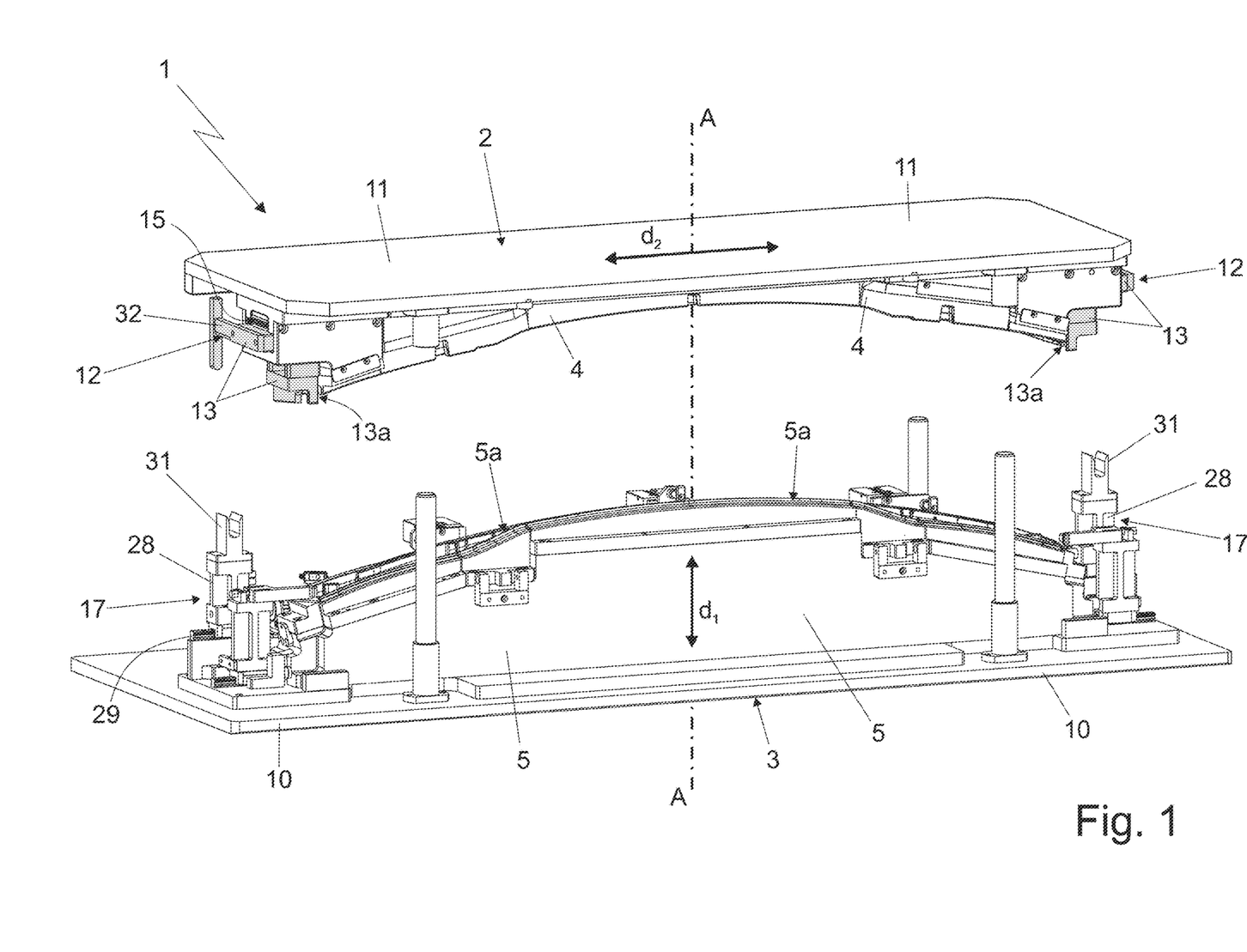
FIG. 1 is a perspective view of a machine for vibration welding workpieces made of plastic materials realized according to the teachings of the present invention, with parts removed for clarity.
Figure 2:
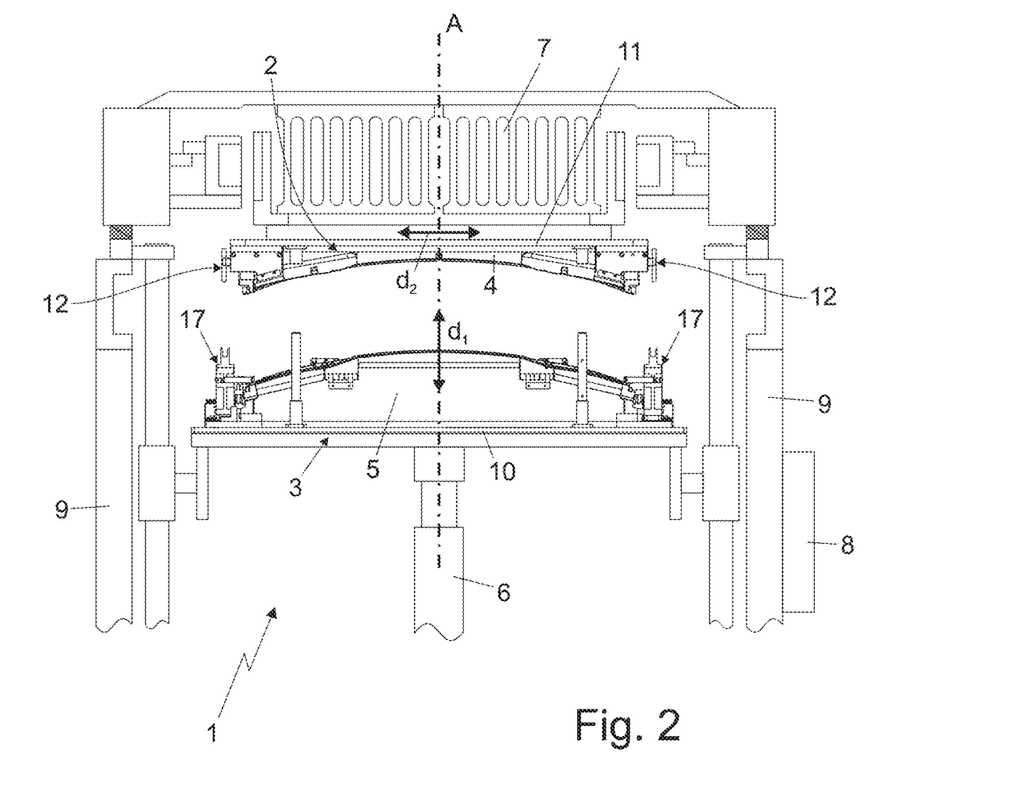
FIG. 2 is a schematic front view of the machine shown in FIG. 1.

With reference to FIGS. 1 and 2, numeral 1 denotes as a whole a machine for welding workpieces made of plastic materials, that can be advantageously used to weld the outer plastic casing of a large automotive light (not shown).

In greater detail, the machine 1 is preferably a machine for vibration welding workpieces made of plastic materials that can be advantageously used to vibration weld the outer plastic casing of a large automotive light (not shown).

In other words, the machine 1 can be advantageously used to vibration weld the front half-shell (not shown) of a large automotive light to the corresponding and complementary rear body (not shown), both made of plastic material preferably via an injection moulding process.

The machine 1 firstly comprises two workpiece-carrying fixtures 2 and 3 that are structured so as to be able to accommodate and securely retain one the front half-shell and the other the rear body of the automotive lamp, and are movable one towards and away from the other so as to be able to selectively couple to one another for arranging the front half-shell and the rear body in abutment one against the other.

In greater detail, the workpiece-carrying fixture 2 is provided with a substantially non-deformable, workpiece-holder template 4 preferably made of metal material, which has a recess 4a substantially complementary in shape to that of the front half-shell of the automotive light, so as to be able to accommodate said front half-shell. Similarly, the workpiece-carrying fixture 3 is provided with a second, substantially non-deformable, workpiece-holder template 5 preferably made of metal material, which has a recess 5a substantially complementary in shape to that of the rear body of the automotive light, so as to be able to accommodate and securely retain the rear body.

The workpiece-carrying fixtures 2 and 3 are movable one towards and away from the other, so as to be able to place the templates 4 and 5 in abutment one against the other when they are coupled to one another.

The templates 4 and 5, in turn, are oriented and structured so as to place, when the corresponding workpiece-carrying fixtures 2 and 3 are coupled together, the peripheral rim of the mouth of the rear body in abutment against the facing and complementary peripheral rim of the front half-shell.

In addition, the workpiece-carrying fixtures 2 and 3 are preferably arranged one in front of the another, with the templates 4 and 5 facing each other, and are preferably movable one towards and away from the other substantially rectilinearly, so as to bring the templates 4 and 5 in abutment one against the other.

In other words, the workpiece-carrying fixtures 2 and 3 are preferably arranged one in front of the other, aligned along a common reference axis A, and are movable one towards and away from the other parallel to said axis A.

Machine 1 additionally comprises: a preferably electrically- or hydraulically-operated, moving assembly 6 which is adapted to selectively couple and press the workpiece-carrying fixtures 2 and 3 one against the other, so as to tighten/press the plastic workpieces accommodated in the corresponding templates 4 and 5 one against the other; a preferably electrically- or hydraulically-operated, vibrating assembly 7 which is adapted to vibrate, on command, one of the two workpiece-carrying fixtures 2, 3 in a predetermined direction; and electronic control unit 8 adapted to control the moving assembly 6 and/or the vibrating assembly 7.

In greater detail, the moving assembly 6 is capable of moving, on command, the workpiece-carrying fixtures 2 and 3 towards and away from one another, so as to selectively place the templates 4 and 5 of workpiece-carrying fixtures 2 and 3 in abutment one against the other, while pressing the templates 4 and 5 one against the other along a given direction $d_1$ preferably substantially perpendicular to the templates 4 and 5, and/or substantially coincident with the coupling direction of the workpiece-carrying fixtures 2 and 3.

The vibrating assembly 7, on the other hand, is capable of vibrating, on command, one of workpiece-carrying fixtures 2, 3, or rather the template 4, 5 of one of the two workpiece-carrying fixtures 2, 3, in a given direction $d_2$ that is preferably locally substantially perpendicular to direction $d_1$ of application of the compressive force on templates 4 and 5, with given amplitude and frequency such as to vibration weld the two pieces of the automotive light.

In the example shown, in particular, the vibrating assembly 7 is preferably structured to vibrate on command one of the two workpiece-carrying fixtures 2, 3 in direction $d_2$, with a frequency preferably ranging between 230 and 250 Hz (Hertz) and with an amplitude preferably lower than 1.5 mm (millimetres) and optionally ranging between 0.4 and 1.2 mm (millimetres).

Moreover, the moving assembly 6 is preferably structured so as to move the workpiece-carrying fixtures 2 and 3 towards and away from one another parallel to axis A. In addition, the moving assembly 6 is preferably structured so as to press the templates 4 and 5 against each other parallel to axis A, i.e. applying a pressure of given value in a direction parallel to axis A.

The vibrating assembly 7, therefore, is preferably structured to vibrate, on command, one of the two workpiece-carrying fixtures 2, 3 in a direction $d_2$ locally substantially perpendicular to axis A.

In the example shown, in addition, the recesses 4a and 5a of workpiece-holder templates 4 and 5 preferably have an oblong shape, and the vibrating assembly 7 is structured so as to vibrate, on command, one of the two workpiece-carrying fixtures 2, 3, or rather the template 4, 5 of one of the two workpiece-carrying fixtures 2, 3, in a direction $d_2$ that is preferably substantially parallel to the longitudinal axis of the recesses 4a and 5a.

In greater detail, the workpiece-holder templates 4 and 5 of workpiece-carrying fixtures 2 and 3 are preferably oblong in shape and extend parallel to direction $d_2$, whereas the recesses 4a, 5a of workpiece-holder templates 4 and 5 extend on the body of the corresponding template 4, 5 parallel to the longitudinal axis of said template 4, 5, i.e. in direction $d_2$, preferably substantially over the entire length of the template 4, 5.

Preferably, a first workpiece-carrying fixture of machine 1 is also stationary in space with the only possibility to freely vibrate in direction $d_2$, whereas the second workpiece-carrying fixture is movable towards and away from the first workpiece-carrying fixture, preferably in rectilinear manner and preferably while remaining parallel to itself.

The moving assembly 6 is thus adapted to move solely the second workpiece-carrying fixture, whereas the vibrating assembly 7 is adapted to vibrate the first workpiece-carrying fixture.

With reference to FIGS. 1 and 2, in the example shown, in particular, the workpiece-carrying fixtures 2 and 3 are preferably arranged spaced one above the other, vertically aligned to one another, and are preferably movable towards and away from one another substantially rectilinearly.

In other words, the workpiece-carrying fixtures 2 and 3 are preferably located one above the other, aligned along a substantially vertical axis A, and are movable towards and away from one another in a substantially vertical direction.

In greater detail, the workpiece-carrying fixture 3 is preferably located beneath the workpiece-carrying fixture 2 and is movable vertically towards and away from the workpiece-carrying fixture 2, preferably in rectilinear manner and preferably while remaining parallel to itself.

On the other hand, the workpiece-carrying fixture 2 is preferably vertically motionless, i.e. it cannot move parallel to axis A, and can freely vibrate in a substantially horizontal direction $d_2$.

In greater detail, with reference to FIGS. 1 and 2, machine 1 is provided with a preferably substantially gantry-shaped, rigid supporting framework 9 which is structured to be firmly rested on the ground, and the workpiece-carrying fixtures 2 and 3 are preferably arranged one above the other on supporting framework 9, vertically aligned to one another.

In addition, the workpiece-carrying fixture 2 is preferably secured to the top of supporting framework 9 in a vertically rigid and horizontally floating manner, with the template 4 facing downwards.

On the other hand, the workpiece-carrying fixture 3 is preferably secured to the supporting framework 9 in a vertically movable manner, with the template 5 facing upwards.

The vibrating assembly 7, in turn, is preferably located above the workpiece-carrying fixture 2 and is firmly coupled to the workpiece-carrying fixture 2, so as to vibrate, on command, the workpiece-holder template 4 horizontally in direction $d_2$.

The moving assembly 6, on the other hand, is preferably located beneath the workpiece-carrying fixture 3, and is adapted to move vertically the workpiece-carrying fixture 3 between a lower position in which the template 5 is at a predetermined maximum distance from the template 4 of workpiece-carrying fixture 2, and a raised position in which the template 5 of workpiece-carrying fixture 3 abuts against the template 4 of upper workpiece-carrying fixture 2.

The moving assembly 6, in addition, is preferably adapted to firmly press the template 5 of workpiece-carrying fixture 3 against the template 4 of workpiece-carrying fixture 2 along direction $d_1$.

In the raised position, the template 5 of workpiece-carrying fixture 3 is therefore arranged in abutment against the template 4 of workpiece-carrying fixture 2, so as to forcefully press the peripheral rim of the mouth of the rear body against the facing and complementary peripheral rim of the front half-shell of the automotive light.

Figure 3:
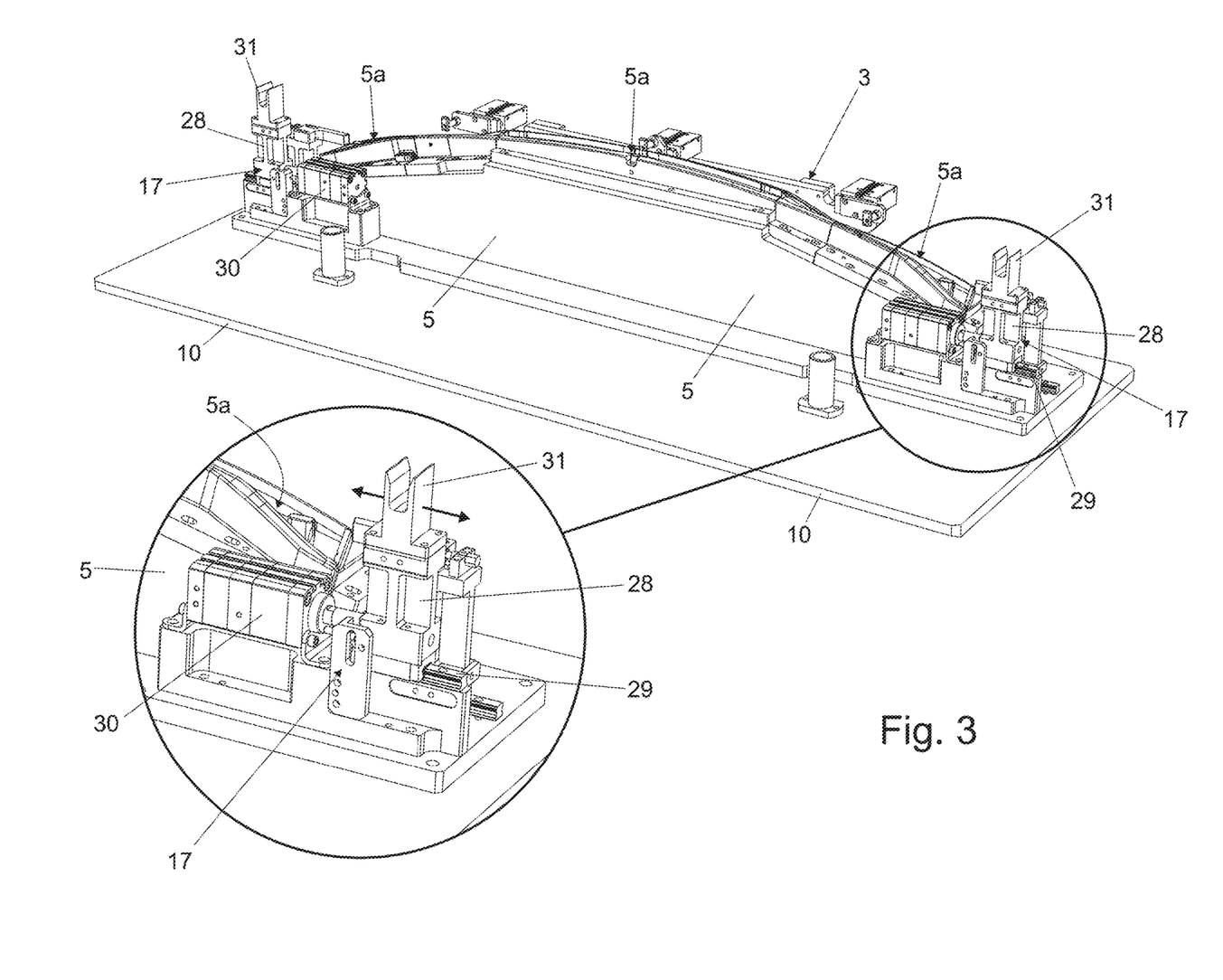
FIG. 3 is a perspective view of the lower fixture of the vibration welding machine shown in FIG. 1, with parts removed for clarity.
Figure 4:
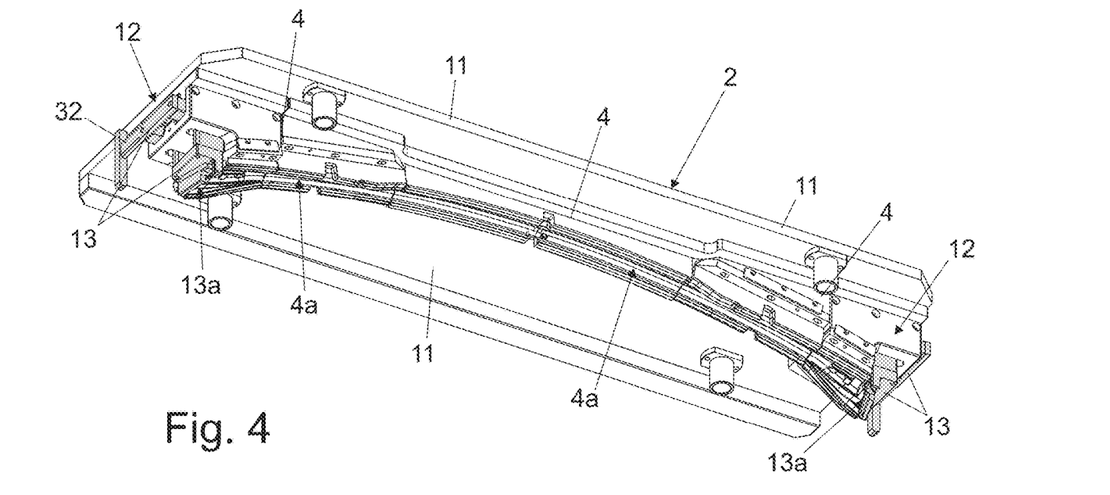
FIG. 4 is a perspective view of the upper fixture of the vibration welding machine shown in FIG. 1, with parts removed for clarity.

With reference to FIGS. 1, 2 and 3, in the example shown, in particular, the workpiece-carrying fixture 3 additionally comprises an intermediate support plate 10 that preferably extends perpendicularly to the direction $d_1$ of application of compressive force, directly supports the template 5, and is secured to the supporting framework 9 with the capability of moving vertically towards and away from the workpiece-carrying fixture 2.

In greater detail, the template 5 is preferably rigidly secured to the upper face of support plate 10 which, in turn, is firmly secured to supporting framework 9, or rather to the vertical uprights of supporting framework 9, in a substantially horizontal position and with the capability to freely slide vertically towards and away from the workpiece-carrying fixture 2.

The moving assembly 6, in turn, preferably comprises: one or more hydraulic or pneumatic cylinders that are located beneath the support plate 10, in a vertical position, and are adapted to move the support plate 10 in a vertical direction towards and away from the superjacent workpiece-carrying fixture 2, preferably under the direct control of the electronic control unit 8.

With reference to FIGS. 1, 2, and 4 to 9, similarly the upper workpiece-carrying fixture 2 preferably additionally comprises an intermediate support plate 11 that preferably extends perpendicularly to the direction $d_1$ of application of compressive force, directly supports the template 4, and is secured to the supporting framework 9 with the capability of moving/vibrating horizontally in direction $d_2$.

In greater detail, the template 4 of workpiece-carrying fixture 2 is preferably rigidly secured to the lower face of support plate 11 which, in turn, is firmly secured to the supporting framework 9 close to the top of the latter, in a substantially horizontal position and with the capability of freely making small movements parallel to its lying plane, i.e. horizontally.

The vibrating assembly 7 is preferably located above the support plate 11 and is firmly coupled to the support plate 11, so as to cause the template 4 to vibrate horizontally in direction $d_2$.

Being a component already widely known in this technical field, the vibrating assembly 7 won't be further described, except to point out that the movement of support plate 11 is preferably generated in known manner by two electromagnets.

With reference to FIGS. 1 to 8, furthermore machine 1 additionally comprises: at least one electrically-operated and self-adjusting, automatic piece locking device 12 which is adapted to selectively lock/immobilise the front half-shell inside the template 4 of workpiece-carrying fixture 2; and an supplementary electronic control unit which is adapted to drive/control the automatic piece locking device(s) 12.

In other words, the automatic piece locking device 12 is adapted to immobilise, on command, the plastic workpiece accommodated inside the vibrating workpiece-carrying fixture, i.e. inside the workpiece-carrying fixture coupled to vibrating assembly 7.

In greater detail, the automatic piece locking device 12 is fixed to the workpiece-carrying fixture 2 with the capability of moving, on command and autonomously, towards and away from a locking position in which the same device is arranged/placed in abutment against the front half-shell temporarily accommodated inside the recess 4a of template 4, so as to prevent any movement of the front half-shell inside the template 4.

Preferably, the supplementary electronic control unit is moreover incorporated into the electronic control unit 8.

With reference to FIGS. 1 and 3, in the example shown, in particular, the machine 1 is preferably provided with two automatic piece locking devices 12 that are preferably arranged one substantially facing the other, preferably substantially on opposite sides of the recess 4a of workpiece-holder template 4.

Preferably, the two automatic piece locking devices 12 are moreover located on the workpiece-carrying fixture 2 one in front of the other, aligned along the vibration direction $d_2$.

In addition, the two automatic piece locking devices 12 are preferably located on the workpiece-carrying fixture 2, at the two axial ends of the oblong recess 4a of workpiece-holder template 4.

In greater detail, the recess 4a of workpiece-holder template 4 is preferably oblong in shape and extends on the body of template 4 parallel to the longitudinal axis of the same template, along the entire length of the template 4, and the two automatic piece locking devices 12 are preferably located on template 4, at the two axial ends of the oblong recess 4a.

The supplementary electronic control unit, in turn, is preferably adapted to control the movement of both automatic piece locking devices 12.

With reference to FIGS. 3 to 8, in particular, the or each automatic piece locking device 12 preferably comprises: a movable latch 13 which is inserted in axially sliding manner into a corresponding oblong seat 14 specially formed in the template 4 of workpiece-carrying fixture 2, and is provided with a locking appendage 13a that is movable at recess 4a of workpiece-holder template 4, towards and away from the front half-shell temporarily accommodated in the recess 4a, so as to be able to selectively abut against the same front half-shell; and an electrically-operated locking member 15 which is interposed between the movable latch 13 and the workpiece-holder template 4, and is adapted to press, on command, the movable latch 13 against the side wall of the oblong seat 14, so as to selectively lock/immobilise the movable latch 13 on the template 4 by friction.

In greater detail, one or more plate(s) made of high friction coefficient material 16 is/are preferably located on the side wall of oblong seat 14, and the electrically-operated locking member 15 is adapted to press the movable latch 13 against said high friction coefficient material plate(s) 16, so as to selectively immobilise the movable latch 13 on the template 4 by friction.

Furthermore, the or each automatic piece locking device 12 is preferably also provided with an electrically-operated moving member 17 which, on command, is adapted to move the movable latch 13 back and forth parallel to its longitudinal axis L, towards and away from a locking position in which the movable latch 13 places the locking appendage 13a in abutment against the front half-shell of the automotive light temporarily accommodated in the recess 4a of template 4, so as to prevent any movement of the piece in the template 4.

The supplementary electronic control unit, in turn, controls the locking member 15 and the moving member 17, and is preferably programmed/configured to activate the locking member 15 when the movable latch 13 is in said locking position.

In greater detail, the moving member 17 is adapted to move, on command, the movable latch 13 back and forth between a first operating position in which the movable latch 13 arranges the locking appendage 13a in abutment against the front half-shell of the automotive light temporarily accommodated in the recess 4a; and a second operating position in which the movable latch 13 arranges the locking appendage 13a at a predetermined maximum distance from the front half-shell temporarily accommodated in the recess 4a.

In addition, the movable latch 13 is preferably housed in the template 4 so as to be able to move parallel to direction $d_2$. In other words, the longitudinal axis L of movable latch 13 is preferably substantially parallel to direction $d_2$.

The moving member 17 is therefore adapted to move the movable latch 13 back and forth along direction $d_2$, towards and away from said locking position.

Preferably, the locking appendage 13a of movable latch 13 is additionally located close to the peripheral rim of the recess 4a of workpiece-holder template 4, so as to be able to selectively abut against the lateral side of the front half-shell temporarily accommodated in the recess 4a of workpiece-holder template 4.

The locking appendage 13a of movable latch 13 is therefore movable rectilinearly along direction $d_2$, towards and away from the lateral side of the front half-shell temporarily accommodated in the recess 4a of template 4.

With reference to FIGS. 1, 2, 3, and 4, preferably the moving member 17 is moreover fixed to the workpiece-carrying fixture 3, and is adapted to temporarily couple with the movable latch 13 when the workpiece-carrying fixture 3 is coupled to the workpiece-carrying fixture 2.

In greater detail, the movable latch 13 is preferably shaped/dimensioned so as to protrude in a cantilever manner from the body of workpiece-holder template 4, and the moving member 17 is preferably structured to temporarily couple to the portion of movable latch 13 protruding in cantilever manner from template 4, when the workpiece-carrying fixtures 2 and 3 are coupled together.

With reference to FIGS. 3 to 8, in the example shown, in particular, the movable latch 13 preferably comprises: a rigid and oblong straight bar 20 that preferably extends parallel to direction $d_2$, and is inserted in axially sliding manner into the body of workpiece-holder template 4 spaced above the recess 4a, or rather spaced above the axial end of the oblong recess 4a, preferably so as to also protrude in cantilever manner outside of workpiece-holder template 4; and a transversal arm 21 that extends cantilevered from the straight bar 20 towards the underlying recess 4a, preferably in a direction substantially orthogonal to the longitudinal axis of the straight bar 20, so as to place its distal end beside the recess 4a, or rather beside to the axial end of the oblong recess 4a.

The distal end of transversal arm 21, in addition, is preferably shaped so as to form a portion of the side wall of the recess 4a, and is therefore adapted to abut against the lateral side of the front half-shell temporarily accommodated into the recess 4a.

The distal end of transversal arm 21 therefore forms the locking appendage 13a of movable latch 13, and is movable in direction $d_2$ towards and away from the lateral side of the front half-shell temporarily accommodated into the recess 4a of template 4.

In addition, in the example shown, the straight bar 20 preferably has a plate-like structure, and the plate(s) made of high friction coefficient material 16 is/are preferably located inside the oblong seat 14, facing and skimmed over one of the two larger faces of the straight bar 20.

Preferably, the movable latch 13 additionally also comprises one or more plate(s) made of high friction coefficient material 22, which is/are firmly secured to the straight bar 20 so as to face and be skimmed over the high friction coefficient material plate(s) 16 integral with the side wall of oblong seat 14. The locking member 15 is thus adapted to selectively press the high friction coefficient material plate(s) 22 against the high friction coefficient material plate(s) 16.

Figure 7:
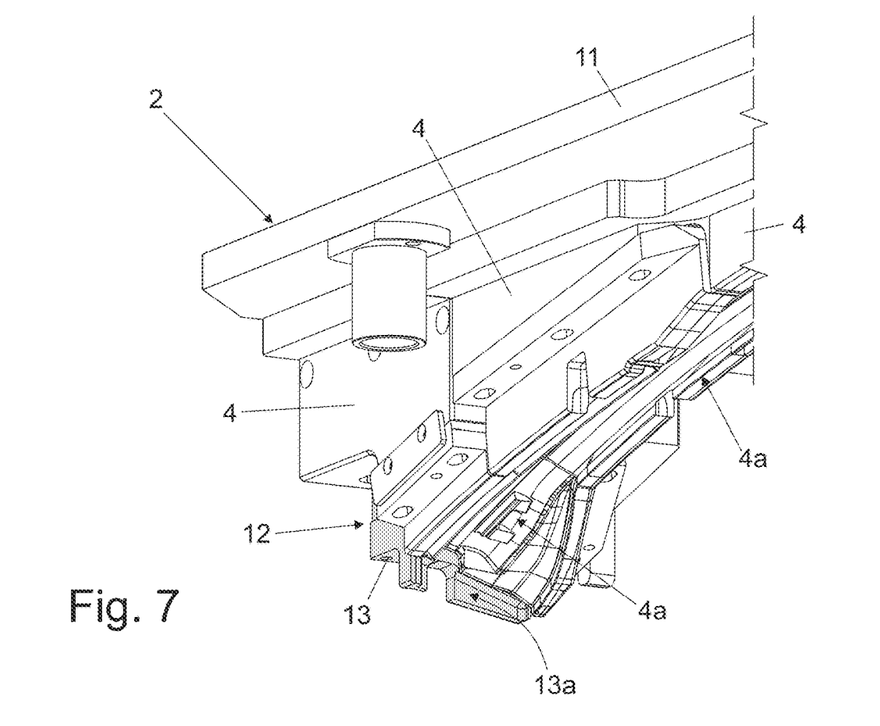
Figure 8:
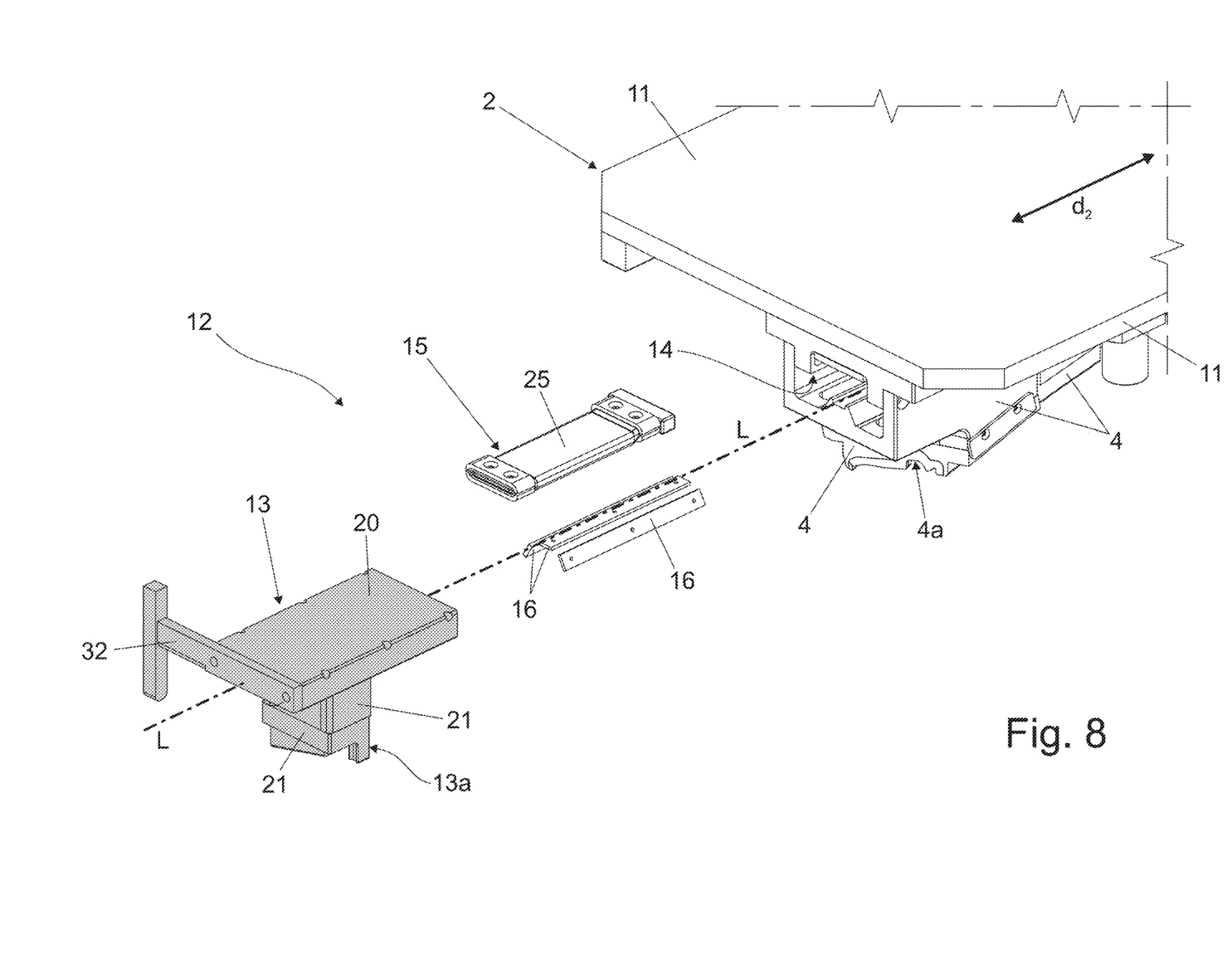

With particular reference to FIGS. 7 and 8, on the other hand, the locking member 15 preferably comprises:

an inflatable cushion 25 preferably made of an elastomeric material, which is located inside the oblong seat 14, between the movable latch 13 and the wall of the oblong seat 14, preferably on the opposite side with respect to the high friction coefficient material plate(s) 16; and an electrically-operated compressed-air distributor (not shown in the figures) which is adapted to inflate and deflate, on command, the inflatable cushion 25 so as to selectively press/push the latch 13 against the side wall of the oblong seat 14.

Obviously, the compressed-air distributor of locking member 15 is preferably controlled by the supplementary electronic control unit.

In the example shown, in particular, the inflatable cushion 25 is preferably substantially rectangular in shape and is preferably accommodated inside a seat or recess specifically formed on one of the two larger faces of straight bar 20, preferably on the opposite side with respect to the high friction coefficient material plate(s) 16.

In greater detail, in the example shown the inflatable cushion 25 is preferably located on the upper face of the straight bar 20, whereas the high friction coefficient material plate(s) 16 is/are preferably faced to the lower face of straight bar 20 that, in turn, houses the high friction coefficient material plate(s) 22.

Figure 5:
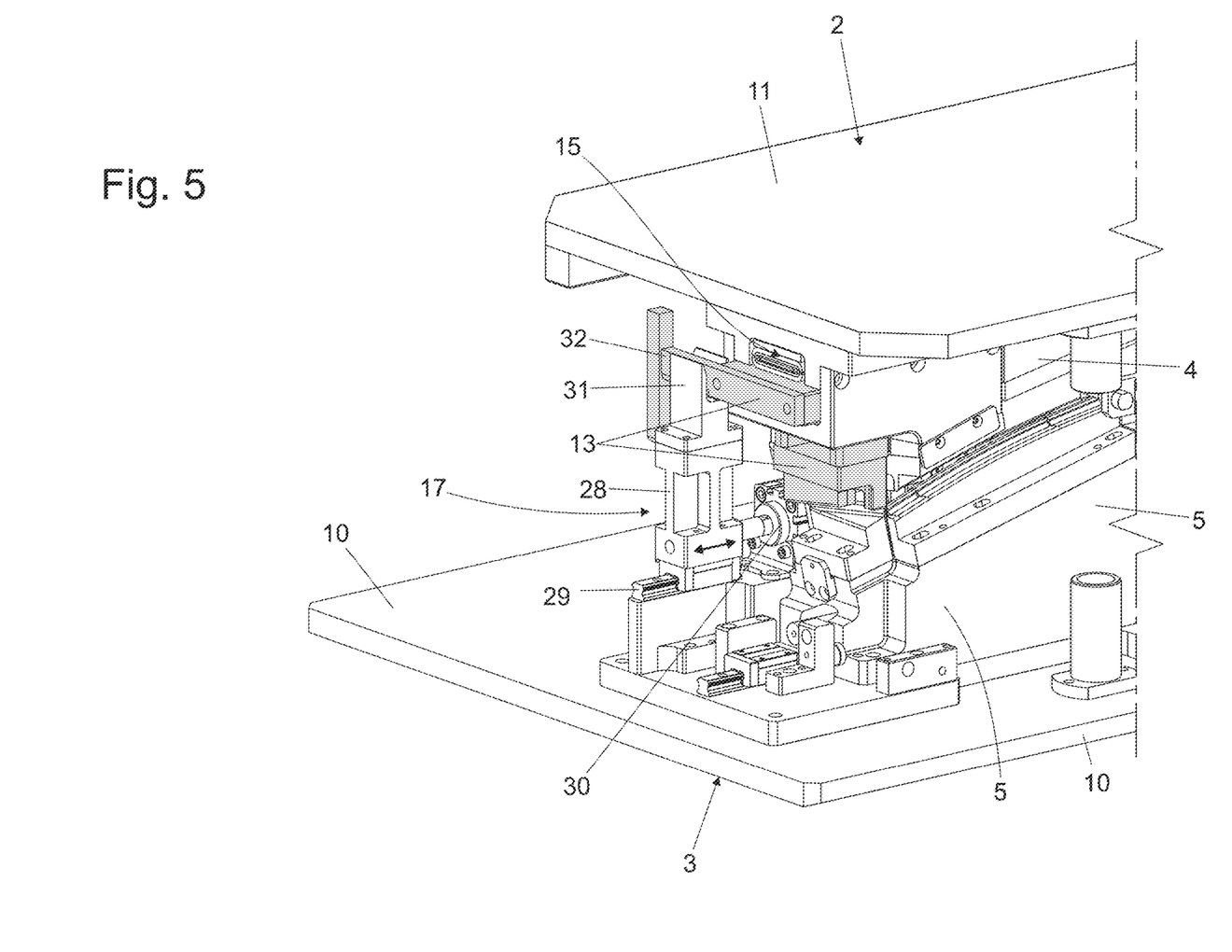
FIG. 5 is a perspective view of a part of the vibration welding machine shown in FIG. 1, in a second operating position and with parts removed for clarity.
Figure 6:
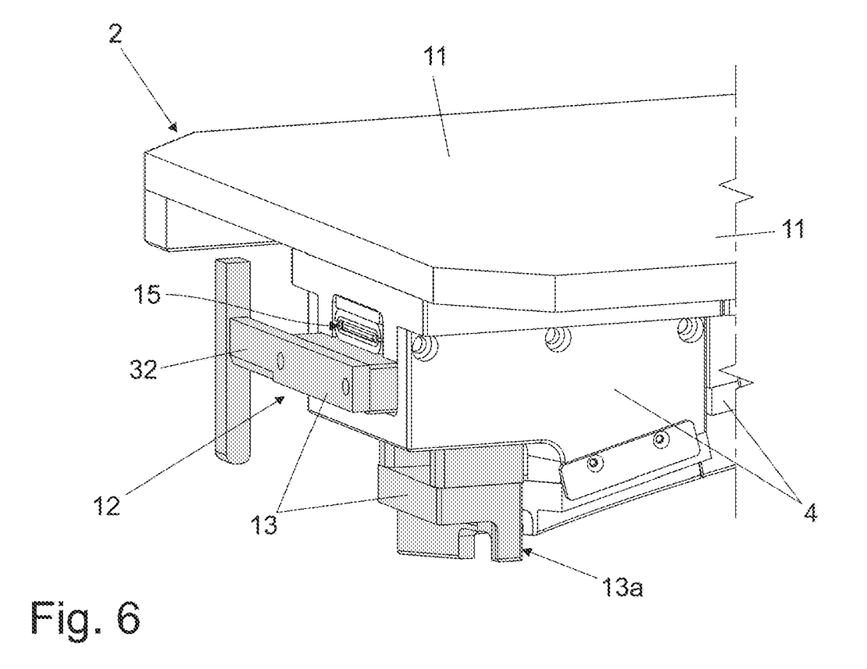
FIGS. 6 and 7 are two perspective views of a portion of the upper fixture shown in FIG. 4, with parts removed for clarity.

With reference to FIGS. 1, 3, and 5, the moving member 17, on the other hand, is preferably located on the support plate 10 of workpiece-carrying fixture 3, beside the workpiece-holder template 5, and is structured so as to be able to move, on command, the straight bar 20 back and forth parallel to its longitudinal axis, i.e. in direction $d_2$.

In addition, moving member 17 preferably comprises: a movable sliding block 28 which is fixed/fitted in axially sliding manner on a straight rail 29 extending over the workpiece-carrying fixture 3, or rather over the support plate 10 of workpiece-carrying fixture 3, parallel to the longitudinal axis L of movable latch 13, or rather parallel to the longitudinal axis of straight bar 20 and therefore parallel to direction $d_2$, and is shaped so as to be able to selectively engage/couple to the movable latch 13; a pneumatic cylinder 30 which is fixed to the workpiece-carrying fixture 3 and is adapted to move the movable sliding block 28 back and forth along the straight rail 29; and lastly a second electrically-operated compressed-air distributor (not shown in the figures) which is adapted to regulate the flow of compressed-air to the pneumatic cylinder 30 so as to be able to change, on command, the position of the movable sliding block 28 on the straight rail 29.

Obviously, the compressed-air distributor of moving member 17 is preferably controlled by the supplementary electronic control unit.

In greater detail, in the example shown, the movable sliding block 28 is preferably provided with a protruding fork 31 that extends cantilevered towards the workpiece-carrying fixture 2 parallel to axis A, i.e. in a vertical direction, and is adapted to selectively straddle the distal portion of a second transversal arm 32 that extends cantilevered from straight bar 20 perpendicularly to the longitudinal axis of straight bar 20 and optionally also perpendicularly to the transversal arm 21.

Figure 9:
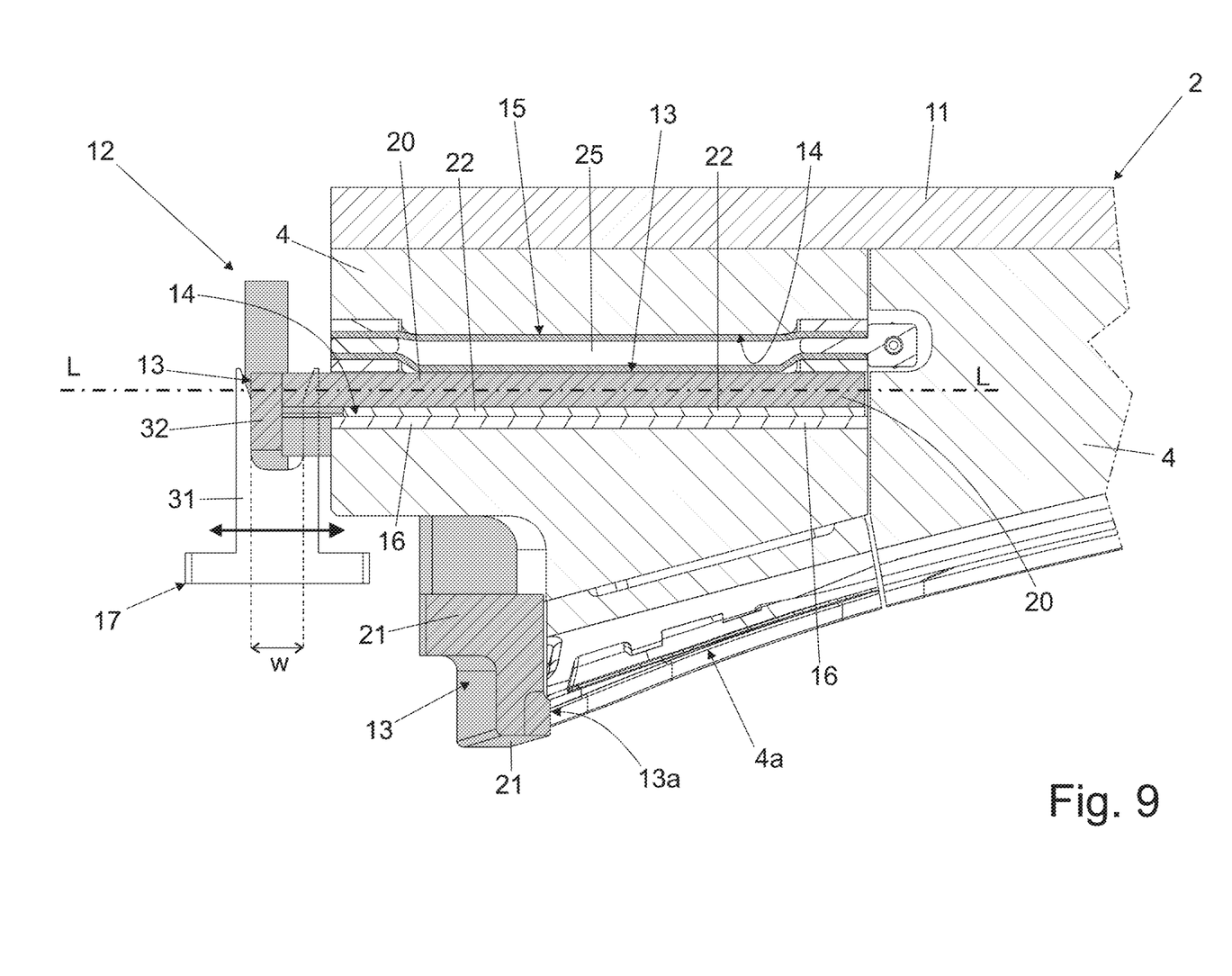
FIG. 9 is a side view of the portion of the upper fixture shown in FIGS. 6 and 7, sectioned along the longitudinal midplane.

With reference to FIG. 9, in addition, the groove of protruding fork 31 preferably has a width w greater than the sum of the local width of the transversal arm 32 and the maximum amplitude of the vibrations/oscillations in direction $d_2$ transmitted by the vibrating assembly 7 to the workpiece-carrying fixture 2.

General operation of machine 1 is easily inferable from the above description and therefore does not require further explanation.

In use, the rear body is preferably manually inserted in the recess 5a of template 5, and locked in place therein. Subsequently, the front half-shell is placed, preferably manually, resting on the rear body. When the templates 4 and 5 are brought in abutment to one another, the front half-shell is accommodated within the recess 4a of template 4 and then is firmly held in place by the automatic piece locking device(s) 12.

As regards the automatic piece locking device(s) 12, with reference to FIGS. 9, 10, and 11, assuming that the workpiece-carrying fixtures 2 and 3 are at the maximum distance from one another and that the movable latch 13 is in the second operating position, the supplementary electronic control unit is adapted to drive the compressed-air distributor of moving member 17 so that the pneumatic cylinder 30 can place the movable sliding block 28, on choice and alternatively:

in a first operating position in which the protruding fork 31 of movable sliding block 28 is aligned with the distal end of the transversal arm 32 of the movable latch 13 motionless in the second operating position, so as to allow the coupling of the two elements;

in a second operating position in which the protruding fork 31 of movable sliding block 28 brings/arranges the movable latch 13 in the first operating position, so as to lock/immobilise the front half-shell of the automotive light inside the recess 4a of template 4; and in a third operating position in which the protruding fork 31 of movable sliding block 28 is centred to the distal end of the transversal arm 32 of movable latch 13, so as to allow the whole upper fixture to freely vibrate/oscillate in direction $d_2$ under the thrust of vibrating assembly 7.

The supplementary electronic control unit additionally drives the compressed-air distributor of moving member 17 so as to move the movable sliding block 28 from the first to the second operating position when the two workpiece-carrying fixtures 2 and 3 are coupled to one another; and then activates the locking member 15, or rather inflates the inflatable cushion 25, so as to lock/immobilise the movable latch 13 against the template 4.

After activating the locking member 15, the supplementary electronic control unit drives the compressed-air distributor of moving member 17 so as to move the movable sliding block 28 from the second to the third operating position.

After the vibrating assembly 7 has vibrated/oscillated the workpiece-carrying fixture 2 in direction $d_2$, the supplementary electronic control unit deactivates the locking member 15, or rather deflates the inflatable cushion 25, and then drives the compressed-air distributor of moving member 17 so as to move the movable sliding block 28 from the first operating position, thus returning the movable latch 13 into its second operating position.

The advantages connected to the particular structure of the automatic piece locking device(s) 12 are remarkable.

Firstly, the locking of movable latch 13 on the body of the workpiece-holder template 4 by friction makes the or each automatic piece locking device 12 completely immune from the effects of the vibrations generated by vibrating assembly 7.

Moreover, the use of two automatic piece locking devices 12 mutually opposed and aligned along the direction $d_2$ of vibration of the workpiece-carrying fixture 2 additionally allows to perfectly and quickly centre the front half-shell of the automotive light in the template 4.

Lastly the particular structure of the automatic piece locking device 12 allows to install the automatic piece locking device(s) 12 also onto workpiece-carrying fixtures of the vibration welding machines currently in use.

It is finally clear that modifications and variations may be made to the above-described machine 1 without however departing from the scope of the present invention.

For example, vibrating assembly 7 may be structured to vibrate the workpiece-carrying fixture 2 with an orbital or circular movement.

In addition, the inflatable cushion 25 and the compressed-air distributor of locking member 15 may be replaced by an electromagnet capable of generating, when powered, a magnetic field that pushes/presses the movable latch 13 against the side wall of the oblong seat 14, so as to lock/immobilise the movable latch 13 on template 4 by friction.

Furthermore, the pneumatic cylinder 30 and the compressed-air distributor of moving member 17 may be replaced by an electrically-operated linear actuator.

Lastly, the recesses 4a and 5a of the workpiece-holder templates 4 and 5 of workpiece-carrying fixtures 2 and 3 may be shaped so as to accommodate plastic workpieces different from the front half-shell and the rear body of an automotive light.

In this case, the automatic piece locking device(s) 12 is/are adapted to immobilise the plastic workpiece temporarily accommodated in the template 4 of workpiece-carrying fixture 2.

In a different embodiment, the machine 1 comprises, in place of vibrating assembly 7, a laser emitter which is adapted to locally heat the peripheral rim of the front half-shell or of the rear body of the automotive light accommodated in the templates 4 and 5 of workpiece-carrying fixtures 2 and 3, so as to cause the localised softening of the plastic material with consequent welding to the adjacent workpiece under the thrust of moving assembly 6.

The invention claimed is:

1. A welding machine (1) for welding workpieces made of plastic material comprising: two workpiece-carrying fixtures comprising a first workpiece-carrying fixture (2) and a second workpiece-carrying fixture (3), the first workpiece-carrying fixture (2) being provided with a first template (4) having a first recess (4a) adapted to accommodate a first plastic workpiece to be welded and the second workpiece-carrying fixture (3) being provided with a second template (5) having a second recess (5a) adapted to accommodate a second plastic workpiece to be welded; and a moving assembly (6) adapted to selectively couple and press the two workpiece-carrying fixtures (2, 3) against each other;

the welding machine being characterised by additionally comprising: at least one automatic piece locking device (12) which is adapted to selectively lock the first plastic workpiece to be welded inside the first template (4) of said first workpiece-carrying fixture (2); and an electronic control unit which is adapted to drive/control said at least one automatic piece locking device (12); and wherein the at least one automatic piece locking device (12) comprises: a movable latch (13) which is inserted in an axially sliding manner into a corresponding oblong seat (14) in the first template (4) of the first workpiece-carrying fixture (2), and is provided with a locking appendage (13a) that is movable at the first recess (4a) of the first template (4) of the first workpiece-carrying fixture (2), so as to be able to selectively abut against the first plastic workpiece temporarily accommodated into the first recess (4a) of said first template (4); and an electrically-operated locking member (15) which is adapted to press, on command, the movable latch (13) against a side wall of the oblong seat (14), so as to selectively lock the movable latch (13) on the first template (4) of the first workpiece-carrying fixture (2) by friction.

2. Welding machine according to claim 1, wherein said at least one automatic piece locking device (12) is fixed to said first workpiece-carrying fixture (2) with the capability of moving, on command and autonomously, towards and away from a locking position in which the at least one automatic piece locking device (12) is arranged in abutment against the first plastic workpiece accommodated inside the first template (4) of the first workpiece-carrying fixture (2), so as to immobilise the first plastic workpiece inside the first template (4).

3. Welding machine according to claim 2, wherein the machine is provided with a first automatic piece locking device and a second automatic piece locking device (12) which are arranged substantially opposite to one another, on opposite sides of the first recess (4a) of the first template (4) of the first workpiece-carrying fixture (2).

4. Welding machine according to claim 1, wherein the machine additionally comprises a vibrating member (7) which is adapted to vibrate, on command, the first workpiece-carrying fixture (2), or a laser emitter which is adapted to heat the peripheral rim of at least one of the first or second plastic workpiece accommodated in at least one of the first template or the second template (4, 5), respectively, so as to cause localised softening of the plastic material.

5. Welding machine according to claim 4, wherein the vibrating member (7) is adapted to vibrate on command the first workpiece-carrying fixture (2) along a given first direction ($d_2$), and the machine is provided with two automatic piece locking devices (12) arranged one in front of the other, substantially aligned along said first direction ($d_2$).

6. Welding machine according to claim 5, wherein the first recess (4a) of the first template (4) of the first workpiece-carrying fixture (2) defines two ends, is oblong in shape and extends on the a body of the first template (4) parallel to said first direction ($d_2$); the two automatic piece locking devices (12) being located at the two ends of said first recess (4a).

7. Welding machine according to claim 1, wherein at least one first plate made of high friction coefficient material (16) is rigidly fixed to a wall of the oblong seat (14), and the electrically-operated locking member (15) is adapted to selectively press the movable latch (13) against said at least one first plate made of high friction coefficient material (16).

8. Welding machine according to claim 7, wherein the movable latch (13) is provided with at least one second plate made of high friction coefficient material (22), which is faced and skimmed over said at least one first plate made of high friction coefficient material (16), and the electrically-operated locking member (15) is adapted to selectively press said at least one second plate made of high friction coefficient material (22) against said at least one first plate made of high friction coefficient material (16).

9. Welding machine according to claim 1, wherein the machine additionally comprises a vibrating member (7) which is adapted to vibrate, on command, the first workpiece-carrying fixture (2) in a given first direction ($d_2$), so as to cause localised softening of the plastic material; and wherein the movable latch (13) is axially movable within the first template (4) of the first workpiece-carrying fixture (2) parallel to said first direction ($d_2$).

10. Welding machine according to claim 1, wherein the electrically-operated locking member (15) comprises: an inflatable cushion (25) which is positioned inside the oblong seat (14), between the movable latch (13) and the side wall of the oblong seat (14); and an electrically-operated compressed-air distributor which is adapted to inflate and deflate, on command, the inflatable cushion (25) so as to selectively press the movable latch (13) against the side wall of the oblong seat (14).

11. Welding machine according to claim 1, wherein the at least one automatic piece locking device (12) additionally comprises an electrically-operated moving member (17) which is adapted to axially move, on command, the movable latch (13) towards and away from a locking position in which the movable latch (13) places the locking appendage (13a) in abutment against the first plastic workpiece accommodated in the first recess (4a) of the first template (4) of the first workpiece-carrying fixture (2) in order to immobilise said first plastic workpiece in the first template (4).

12. Welding machine according to claim 11, wherein the electrically-operated moving member (17) is located on the second workpiece-carrying fixture (3) and is adapted to temporarily couple with the movable latch (13) when the second workpiece-carrying fixture (3) is coupled to the first workpiece-carrying fixture (2).

13. Welding machine according to claim 12, wherein the electrically-operated moving member (17) comprises: a movable sliding block (28) which is fitted in an axially sliding manner onto a straight rail (29) extending over the second workpiece-carrying fixture (3) parallel to a longitudinal axis (L) of the movable latch (13), and is shaped so as to selectively engage the movable latch (13); and a linear actuator (30) adapted to move the movable sliding block (28) back and forth on the straight rail (29) in order to change, on command, the position of the movable sliding block (28) along said straight rail (29).

14. Welding machine according to claim 1, wherein the moving assembly (6) is adapted to press the first and second templates (4, 5) of the two workpiece-carrying fixtures (2, 3) one against the other in a second direction ($d_1$) substantially perpendicular to axes defined by said first and second templates (4, 5).

15. Welding machine according to claim 14, wherein a vibrating member (7) is adapted to vibrate, on command, the first workpiece-carrying fixture (2) to vibrate on command in a given first direction ($d_2$), and the second direction ($d_1$) is substantially perpendicular to said first direction ($d_2$).

16. Welding machine according to claim 1, wherein the first and second templates (4, 5) of the two workpiece-carrying fixtures (2, 3) are dimensioned to accommodate, respectively, a front half-shell and a rear body of an automotive light.

* * * * *